United States Patent
Shuster et al.

(10) Patent No.: US 11,578,244 B2
(45) Date of Patent: Feb. 14, 2023

(54) THERMOPLASTIC SHAPE-STABLE POLYMER COMPOSITIONS FOR STORING THERMAL ENERGY

(71) Applicant: CARMEL OLEFINS LTD., Haifa (IL)

(72) Inventors: Michael Shuster, Nesher (IL); Michael Gishboliner, Karmiel (IL); Rotem Shemesh, Haifal (IL)

(73) Assignee: CARMEL OLEFINS LTD., Haifa (IL)

( * ) Notice: Subject to any disclaimer, the term of this patent is extended or adjusted under 35 U.S.C. 154(b) by 426 days.

(21) Appl. No.: 16/642,683

(22) PCT Filed: Aug. 25, 2019

(86) PCT No.: PCT/IL2019/050951
§ 371 (c)(1),
(2) Date: Feb. 27, 2020

(87) PCT Pub. No.: WO2020/129038
PCT Pub. Date: Jun. 25, 2020

(65) Prior Publication Data
US 2021/0130670 A1    May 6, 2021

Related U.S. Application Data

(60) Provisional application No. 62/780,532, filed on Dec. 17, 2018.

(51) Int. Cl.
| C09K 5/06 | (2006.01) |
| F28D 20/02 | (2006.01) |
| B29B 9/06 | (2006.01) |
| B29K 23/00 | (2006.01) |
| B29K 105/24 | (2006.01) |

(52) U.S. Cl.
CPC .............. *C09K 5/063* (2013.01); *B29B 9/065* (2013.01); *B29K 2023/065* (2013.01); *B29K 2023/12* (2013.01); *B29K 2105/24* (2013.01); *B29K 2995/0039* (2013.01); *B29K 2995/0041* (2013.01)

(58) Field of Classification Search
CPC .. C09K 5/063; B29B 9/065; B29K 2023/065; B29K 2023/12; B29K 2105/24; B29K 2995/0039; B29K 2995/0041
See application file for complete search history.

(56) References Cited

U.S. PATENT DOCUMENTS

| 4,183,876 | A | 1/1980 | Coran et al. |
| 5,565,132 | A | 10/1996 | Salyer |
| 7,589,154 | B2 | 9/2009 | Rakhman et al. |
| 8,333,903 | B2 | 12/2012 | Rolland et al. |
| 9,914,865 | B2 | 3/2018 | Sawafta et al. |
| 2011/0248208 | A1 | 10/2011 | Rolland et al. |
| 2012/0036557 | A1 | 2/2012 | Li |
| 2016/0090521 | A1 | 3/2016 | Yoshida et al. |
| 2017/0370656 | A1 | 12/2017 | Kawazoe et al. |

FOREIGN PATENT DOCUMENTS

| CN | 102070845 | 5/2011 |
| CN | 106801266 | 6/2017 |
| EP | 2261297 | 12/2010 |
| EP | 3009489 | 4/2016 |
| EP | 3239270 | 11/2017 |
| EP | 3372653 | 9/2018 |
| JP | H0559352 | 3/1993 |
| JP | 2015054918 | 3/2015 |

OTHER PUBLICATIONS

International Search Report and Written Opinion for PCT/IL2019/050951 dated Nov. 12, 2019, 10 pages.
Ruokangas, Sasu, "Rubber-Phase Change Material Comprises for Heat Storage Applications", Jan. 1, 2018.
Sari, A et al., Polyethyl Methacrylate (PEMA) Fatty Acids Blends as Novel Phase Change Materials for Thermal Energy Storage, Energy Sources, Part A: Recovery Utilization and Environmental Effects, 35:19, 1813-19.
Boh, Bojana et al., "Microencapsulation of essential oils and phase change materials for applications in textile products". Indian Journal of Fibre & Textile Research, vol. 31, Mar. 2006, pp. 72-82.
Bruna Gioia et al.,""Green" Organogelators: Design and Applications". Research and Reviews: Journal of Pharmacy and Pharmaceutical Sciences 7(1), 2018, 1-11.
Terech, P. et al., Low Molecular Weight Gelators of Organic Liquids and the Properties of Their Gels. Chem. Rev. 1997, 97, 3133-3159.
Chinese Notice of Allowance for corresponding Chinese Patent Application No. 201980009219.9, dated May 5, 2022, 5 pages.
Liboniu et al., "1, 3: 2, 4-di-(3, 4-dimethyl) benzylidenesorbitolorganogelused as phase change materials: solvent effects on structure, leakage and thermal performance". RSC Advances, The Royal Society of Chemistry 2015, Issue 28, 19 pages.
Puig et al., "Epoxy-Based Organogels for Thermally Reversible Light Scattering Films and Form-Stable Phase Change Materials"(Abstract), ACS Appl, Mater, Interfaces vol. 9, No. 12, 8 pages.
Wu et al., "Preparation and properties of a novel form-stable phase change material based on a gelator", Journal of Materials Chemistry A, vol. 3, 2015, pp. 2589-2600.
Zhang et al., "Novel gelatinous shape-stabilized phase change materials with high heat storage density" (Abstract), Solar Energy Materials and Solar Cells, vol. 95, Issue 4, Apr. 2011, 4 pages.

*Primary Examiner* — Ryan M Ochylski
(74) *Attorney, Agent, or Firm* — Dority & Manning, P.A.

(57) ABSTRACT

The invention provides shape-stable products for storing and releasing thermal energy, based on thermoplastic polymer compositions containing organic phase change materials (PCM) incorporated into a polymer matrix, the products withstanding multiple melting-crystallization cycles of the PCM while maintaining their shape, dimensions, and the thermal energy storage capacity.

14 Claims, No Drawings

US 11,578,244 B2

THERMOPLASTIC SHAPE-STABLE POLYMER COMPOSITIONS FOR STORING THERMAL ENERGY

CROSS REFERENCE TO RELATED APPLICATIONS

This application is the U.S. National Stage entry of International Application Number PCT/IL2019/050951 filed under the Patent Cooperation Treaty having a filing date of Aug. 25, 2019, which claims priority to U.S. Provisional Patent Application No. 62/780,532 having a filing date of Dec. 17, 2018, which are incorporated herein by reference.

FIELD OF THE INVENTION

The present invention relates to thermal energy storage materials. Particularly, the present invention relates to materials capable of storing thermal energy in a form of latent heat. More particularly, the present invention relates to shape-stable polymer compositions comprising organic constituents capable of storing and releasing thermal energy in a form of latent heat via phase change transitions.

BACKGROUND OF THE INVENTION

Thermal Energy Storage (TES) is considered as an indispensable technology for sustainable energy use allowing efficient energy saving, management, recovery, supply-demand matching, temperature control etc. Phase change materials (PCM) provide convenient TES method via latent heat of phase transitions storage and release. PCM can be of organic or inorganic nature.

While benefits of using PCM for energy storage are known for a long time (e.g. use of ice for food preservation), strong boost in their use is observed recently because of numerous regulations requiring significant energy efficiency improvements in various areas and applications.

Organic PCM like paraffins, fatty acids, fatty acid esters, and others are attractive candidates for TES applications by virtue of being non-corrosive, having high latent heat, availability of the substances with various phase transition temperatures, low density, rather sharp and congruent phase transitions. One problem, limiting wide use of organic PCM in various applications, including devices and installations, is their lack of shape and dimensional stability, since after a solid-liquid phase transition, being in the liquid state, molten PCM does not keep its original shape and dimensions.

In order to ensure convenient use of organic PCM and articles made thereof (expanding scope of their applications), measures preventing loss of initial geometry, leakage and large volume changes during solid-liquid phase transitions should be undertaken. Such measures may include, for example, PCM encapsulation within shell, impregnation within porous substrates, filling cavities in devices and installations. Encapsulated organic PCM are commercially available from Rubitherm, Devan Chemicals, BASF, Outlast, Croda, and other companies. Detailed description of organic PCM encapsulation techniques may be found, for example, in Boh and Knez (Boh B. and Knez E., Indian J. Fibre Text. Res., V31, 2006, 72-82). Encapsulation procedures usually are expensive and do not always provide a satisfactory solution, since encapsulated products are sensitive to processing conditions, their shells may easily break under shear stresses applicable in polymer processing. For PCM incorporated in the cavities or pores, the volume change during phase transitions may result in inferior thermal contact.

PCM incorporation within polymer matrix may be advantageous, providing better heat storage and release efficiency when PCM content within the matrix is high enough. However, even being incorporated in polymer matrix, PCM gets liquid and may leak, migrate and coalesce, resulting in shape and dimensional instability, especially at high loadings of PCM. PCM keeping their geometry during multiple phase transitions are known as Shape-stable PCM (SS PCM). Reduction of PCM leakage propensity can be achieved by impeding its flowability via significant increasing of viscosity. U.S. Pat. No. 5,565,132 discloses a polymer-PCM composition, wherein PCM is thickened by addition of fine silica powder with primary particle size between 0.005 and 0.025 microns and having a surface area from 50 to 500 square meters per gram. Incorporation of the nano-sized silica at the recommended loading levels (7-16% of composition weight) reportedly ties up the low-melting PCM, turning it in a stable "rather stiff" gel, thereby preventing oozing. However, presence of highly dispersed inorganic nano-filler in such a high concentration, increases density of the whole composition and significantly raises its viscosity in molten state, adversely affecting the preparation process, melt processability and moldability. Moreover, feeding of the fine silica into mixing devices during the composition preparation process may be technically challenging due to low bulk density of the powder, and also due to health concerns. There is a need for thermoplastic shape-stable thermal energy storage materials, SS PCM having PCM incorporated into polymer matrix, which may be easily prepared and shaped using conventional techniques and being capable to withstand multiple PCM melting-crystallization cycles, while keeping their TES capacity, shape and dimensions unchanged.

It is therefore an object of this invention to provide shape-stable thermoplastic polymer compositions able to store and release thermal energy, comprising at least one organic phase change material (PCM), incorporated into a polymer matrix and immobilized therein by temperature reversible gelation, using organogelators.

This invention aims at providing shape stable (SS) thermoplastic polymer compositions, comprising 10-80 wt % organic PCM.

This invention also aims at providing a process for manufacturing of said SS thermoplastic polymer compositions, comprising organic PCM.

It is also an object of this invention to provide shaped and shape-stable articles made of said compositions by techniques conventional for shaping of thermoplastic polymers.

Other objects and advantages of present invention will appear as the description proceeds.

SUMMARY OF THE INVENTION

The invention provides a thermoplastic shape-stable polymer composition configured to store and release thermal energy, the composition comprising at least one organic PCM, and a polymer matrix comprising at least one highly crystalline polymer (polymer A) and at least one low crystallinity or substantially amorphous polymer (polymer B). Additionally, the composition comprises at least one organogelator inducing temperature stimulated reversible gelling of molten compositions. Said PCM comprises a crystalline organic material having a high latent heat of phase transition. Said PCM is preferably chosen from normal paraffins, fatty acids, and blends thereof. Said PCM usually constitutes from 10 to 80 wt % of the composition. Said polymer A preferably constitutes between 20 and 55 wt % of the polymer matrix. Said polymer A is preferably a thermoplastic polymer with a melting temperature above melting temperature of said PCM. Said polymer A is preferably chosen from crystalline polyolefins, polyesters, polyethers, polyamides, and blends thereof. In a preferred embodiment of the invention, said polymer A is polypropylene or high density polyethylene. Said polymer B in the molten state is preferably at least partially miscible with said molten PCM. Said polymer B is preferably chosen from low density polyethylene, random copolymers of ethylene with C3-C10 alpha-olefins, random copolymers of propylene with C4-C10 alpha-olefins, ethylene-propylene-diene copolymers, olefin block-copolymers, styrenic block-copolymers, polyolefin elastomers, and blends thereof. The composition of the invention, comprising organogelator, is a solidified gelled composition, while PCM undergoes multiple phase transitions. Said organogelator causes a sharp increase of the composition viscosity on cooling below the gelation onset temperature, and a sharp decrease in PCM viscosity on heating above the gel dissolution temperature, as will be described below. Said organogelator has preferably gelation onset temperature above crystallization temperature of said polymer A. In preferred embodiments, said organogelator is chosen from sorbitol or nonitol derivatives. The composition according to the invention may comprise additional organogelators, having gelation onset temperatures below crystallization temperature of polymer A and above crystallization temperature of said PCM. Said additional organogelators may be chosen from hydroxy-carboxylic acids. The organogelators usually constitute from 0.01 to 5 wt % of the composition. Said organogelators do not affect viscosity of the composition of the invention in molten state above the corresponding gel dissolution temperatures. This feature is advantageous for the process of preparing the composition and its shaping. Said polymer B is optionally dynamically cross-linked in the presence of said polymer A.

The invention provides a process for manufacturing thermoplastic shape-stable polymer compositions configured to store and release thermal energy, comprising melt mixing in a device at least one highly crystalline polymer, polymer A of a polymer matrix, and at least one low crystallinity or substantially amorphous polymer, polymer B of the polymer matrix, with an organic phase change material (PCM) and at least one organogelator, continuously or batch-wise, whereas the organic PCM is fed into said device in solid or liquid state. The process of the invention may comprise a pelletizing step. Said PCM is preferably fed in molten state via liquid feeding system, heated to prevent PCM from solidifying during said feeding. Optionally, the process of the invention comprises dynamic cross-linking of said polymer B in the presence of said polymer A. In some aspects, the process of the invention comprises a shaping step selected from extrusion, injection molding, compression molding, and 3D-printing.

The invention is directed to a shape-stable product comprising the compositions described above and having the form of filaments, pellets, profiles, sheets, molded articles, films, or fibers.

DETAILED DESCRIPTION OF THE INVENTION

In one aspect the present invention provides shape-stable thermoplastic polymer compositions capable of storing and releasing thermal energy as a latent heat and staying in solid state, whereas some of their major constituents undergo multiple melting-crystallization phase transitions. The process of storing and releasing of the thermal energy takes place within a relatively narrow temperature interval of the phase transition, which can be tailored for specific applications. Such compositions are chemically inert, non-corrosive, recyclable and easily processable by conventional plastic processing techniques.

Compositions of the present invention comprise an organic phase change material (PCM), an organogelator, and a polymer matrix, said polymer matrix comprising at least one highly crystalline polymer and at least one low crystallinity or substantially amorphous polymer. Preferably, the low crystallinity or substantially amorphous component of the polymer matrix in the molten state is miscible with the molten PCM, and compatible therewith, but is not miscible with the molten highly crystalline polymer. More preferably, said low crystallinity or substantially amorphous polymer in the molten state is partly soluble within the molten PCM, thus providing significant viscosity increase of the said PCM. According to IUPAC recommendations (2004), for the purposes of the present invention, term "compatible" is used in a technical meaning of the components being immiscible, but able to form useful macroscopically homogeneous polymer blend. Such blend exhibits macroscopically uniform physical properties throughout its whole volume and keeps mechanical integrity under the intended conditions of use (see, for example, Pure Appl. Chem., Vol. 76, No. 11, pp. 1985-2007, 2004). Accordingly, term "miscible" means the components being able to form over certain ranges of temperature, pressure and composition, homogeneous single phase. The organic PCM is distributed within said polymer matrix. Not in connection with any specific theory, intuitively, it is expected that the organic PCM partitioning within the polymer matrix should be according to its affinity to said polymer matrix components. Such partitioning in favor of the low crystallinity or substantially amorphous component of polymer matrix, in combination with the highly crystalline component, may lead to formation of a multiphase system with organic PCM being effectively immobilized within the composition, thus impeding its ability of flow, leakage, migration, and coalescence.

The compositions of the present invention further comprise at least one organogelator capable of gelling the molten composition. For the purpose of describing this invention we use terms gel, organogel, gelling, gelation, gelator or organogelator in a way similar to that used in Terech and Weiss (Terech P. and Weiss R., "Low Molecular Weight Gelators of Organic Liquids and the Properties of Their Gels", Chem. Rev. 97, 1997, 3133-3159). Accordingly, term "organogelator" is used to describe an organic compound, preferably having a low molecular weight, capable of turning an organic liquid into organogel, wherein "organogel" is a thermally-reversible viscoelastic solid-like material obtained by gelation of an organic liquid by means of organogelators, preferably in low concentrations. A comprehensive review of organogelators may be found in Gioia et al. (Gioia B., Ben Ghalia N., and Kirilov P., "Green Organogelators: Design and Applications", Research and Reviews: Journal of Pharmacy and Pharmaceutical Sciences 7(1), 2018, 1-11). Term "gelling" or "gelation" is used to describe a process of organogel formation by cooling of the organic liquid, whereas its viscoelastic properties, such as viscosity, storage and loss moduli, undergo a sharp increase at certain temperature. Use of organogelators aims at preserving melt structure of the composition (relative location of the components within the molten composition) during crystallization and solidification of the components. Upon heating, the said viscoelastic properties of organogel undergo a sharp decrease, associated with the gel dissolution, usually at higher than gelation temperature, providing a hysteresis-like behavior during heating-cooling cycle. Thus, gelling by means of organogelators is reversible and temperature stimulated. It is a significant advantage of organogelators that they facilitate the preparation and shaping of the desired composition, while maintaining reasonably low viscosity above the gel dissolution temperatures, when the entire composition is in liquid state. At work temperatures of the shaped articles, that are below the gelation onset but above the PCM melting, viscosity of the liquid PCM remains high, so said PCM is effectively solidified and immobilized, preventing leakage and providing the shape stability. The solidified gelled composition, with the organic PCM immobilized within, stays solid upon the PCM undergoing multiple phase transitions. For detection of formation and dissolution of organogels, temperature sweep oscillatory rheological experiments may be employed. Optionally, the composition of the present invention may comprise other additives.

The invention provides a manufacturing process allowing simple production of said compositions with good thermal performance and shape stability using conventional plastics processing equipment. Such process comprises intimate melt mixing of the polymer matrix components with organic PCM and organogelator, using continuous or batch melt mixing devices, whereas the organic PCM is fed into said device in solid or liquid state. Preferably, the organic PCM is fed in molten state via liquid feeding system. More preferably, such liquid feeding system is heated to prevent PCM solidifying during feeding.

The invention further provides shape-stable products made of said composition. Such products include, but are not limited to filaments, pellets, profiles, sheets, molded articles, films and fibers. Such products may be shaped by any shaping technique suitable for thermoplastic polymers, including extrusion, injection molding, compression molding, 3D-printing, etc. The products advantageously maintain stable shape and dimensions, and also the thermal energy storage capacity.

Compositions of the Invention

The polymer compositions of the present invention are multicomponent materials, comprising at least one phase change material constituent, at least one organogelator, and a polymeric matrix. Optionally, polymer compositions of present invention comprise additives. Phase change material constituents of the present invention, PCM, are crystalline organic materials having high latent heat of the phase transition. Organic PCM include, but are not limited to crystalline hydrocarbons, carboxylic acids, esters, alcohols, and polyglycols. Preferably, PCM constituents of the present invention are selected from crystalline normal paraffins, fatty acids, fatty acid esters, and their blends, preferably eutectic blends. Melting point of each PCM component should be lower than that of the highly crystalline component of the polymer matrix. The content of PCM constituents within the composition is from 10 to 80 wt %, such as from 20 to 80 wt %, preferably from 20 to 75 wt %, more preferably from 30 to 70 wt %. An excessive PCM content may cause inferior shape stability of the composition. A low PCM content may cause insufficient thermal energy storage (TES) capacity of the composition. Polymer matrices of the present invention are multicomponent materials. The polymer matrices comprise at least one thermoplastic highly crystalline polymer (polymer A) with melting temperature above melting temperature of the said PCM constituents and at least one low crystallinity or substantially amorphous polymer (polymer B).

The highly crystalline component of the polymer matrices, polymer A, may be selected from the group consisting of crystalline polyolefins, polyesters, polyethers, and polyamides. Examples of such polymers include, but are not limited to polypropylene, high and medium density polyethylene, polyethylene terephthalate, polybutylene terephthalate, polytrimethylene terephthalate, polylactic acid, polycaprolactone, polycaprolactam, polyhexamethylene adipamide, polyoxymethylene, copolymers and blends thereof. Such crystalline components demonstrate high degree of crystallinity in the solid state. Preferably, the thermoplastic highly crystalline polymer is selected from highly crystalline polyolefins, such as polypropylene and high density polyethylene. Preferably, these polymers should have melt viscosity high enough to maintain melt processability of the entire composition.

Low crystallinity or substantially amorphous component of the polymer matrices, polymer B, may be a fully amorphous polymer or a polymer exhibiting relatively low degree of crystallinity. Examples of such polymers include, but are not limited to low density polyethylene, random copolymers of propylene with ethylene or $C_4$-$C_{10}$ alpha-olefins, random copolymers of ethylene with $C_3$-$C_{10}$ alpha-olefins, ethylene-propylene-diene copolymers, olefin block-copolymers, styrenic block-copolymers, and polyolefin elastomers. The low crystallinity or substantially amorphous component of the polymer matrices should be fully compatible and, preferably at least partially miscible with the PCM constituent.

Said polymer B of the polymer matrices may be either thermoplastic or partially or fully cross-linked polymer. If polymer B is thermoplastic, preferably it is of molecular weight high enough to keep high viscosity in the presence of PCM constituent. If polymer B is partially or fully cross-linked, preferably dynamically crosslinked in the presence of polymer A, the entire polymer matrix of the current invention should nevertheless remain thermoplastic. In this case, said low crystallinity or substantially amorphous component should be cross-linkable. The content of the crystalline component A of the polymer matrices is between 20 and 55 wt % of the entire polymer matrix, preferably between 30 and 50 wt %. Accordingly, the content of the low crystallinity or substantially amorphous component B of the polymer matrices is between 45 and 80 wt %, preferably between 50 and 70 wt %, of the entire polymer matrix. An excessive content of the crystalline component in the polymer matrices may result in insufficient capability of the polymer matrix to incorporate and retain high content of PCM constituent. An excessive content of the low crystallinity or substantially amorphous component may result in lowered shape stability and/or in leakage of PCM constituents.

PCM constituents of the present invention are immobilized within the thermoplastic polymer matrices. Immobilization means preventing leakage or migration of PCM constituents outside the matrix, coalescence and creation of macroscopic domains of PCM constituents within the matrix, which would result in significant change of overall or local concentrations of PCM constituents or their distribution. Besides immobilizing the PCM constituents, the matrix imparts to the composition processability during production step, ability to be shaped or molded, shape stability, mechanical strength and recyclability.

The compositions of the invention comprise at least one organogelator, melt soluble in the polymer matrix. Such organogelator, further referred to as a primary organogelator, is capable of gelling the polymer matrix, has good miscibility with the PCM constituents and preferably gels the PCM constituents themselves. More preferably, such primary organogelator has gelation onset temperature above crystallization temperature of the said highly crystalline polymer A. Said primary organogelators may be selected from, but are not limited to sorbitol or nonitol derivatives, and are commercially available, for example from Milliken, NJC. Optionally, additional organogelators can be used, differing from primary organogelator and from each other in their chemical structure, polarity, gelling ability and gelation onset temperature. Preferably, the additional gelators have gelation onset temperatures below crystallization temperature of component A and above crystallization temperature of the PCM. Said additional gelators may be selected from, but are not limited to hydroxy-carboxylic acids gelling agents. The example of such additional gelators is 12-hydroxy-stearic acid (commercially available). Use of the additional gelators provides additional means of organic PCM immobilization within the polymer matrix. Multiple gelators are expected to exhibit double or even multiple gelation events on cooling. The total content of organogelators may be between 0.01 and 5 wt %, preferably between 0.1 and 2 wt %, more preferably between 0.3 and 1.5 wt % of the entire composition.

Optionally, the polymer compositions of the invention may comprise additives. Such additives may include, but are not limited to fillers, antioxidants, functionalized polymers, light stabilizers, acid scavengers, colorants, etc. Optional fillers may include, but are not limited to particulate inorganic materials and minerals like talc, calcium carbonate, silica, clay, nanoclay, organoclay, glass beads; carbon based materials like carbon black, expanded and thermooxidized graphite, graphene and graphene-derived particles, carbon nano-tubes; fibrous materials, like glass, carbon or graphite fibers, wollastonite, cellulose fibers, and particles of micro- or nano-encapsulated PCM Said functionalized polymers may be selected from polyolefins grafted or copolymerized with unsaturated acids or anhydrides, vinyl esters, acrylic or methacrylic esters, or combinations thereof. Other optional additives are chosen from the commercially available additives for thermoplastic polymers, in accordance with the desired application.

Process of the Invention

The polymer compositions of the present invention can be produced via melt mixing of said PCM constituents with said polymer matrix components, organogelator, and the additives, using conventional plastics compounding equipment. The process of the invention comprises providing at least one organic PCM, at least one highly crystalline polymer (component A of polymer matrix), at least one low crystallinity or substantially amorphous polymer (component B of polymer matrix), and at least one organogelator, and optional additives, and mixing said components in proportions defined above and in specific sequence defined below. The process further comprises pelletizing, shaping and solidifying the final composition.

The melt mixing of the components may be performed continuously or batchwise. In the preferred embodiment of the invention, the melt mixing is performed using a co-rotating twin-screw extruder. Such extruder, preferably having L/D ratio of at least 40, is equipped with a proper feeders for solids and at least one feeder for liquids. Most preferably such melt mixing is performed at temperatures allowing full dissolution of organogelator in the molten polymer mixture prior to the addition of the PCM constituent. Most preferably, a PCM constituent is fed to the extruder via liquid feeding port into the pre-mixed polymer melt. If necessary, the PCM constituent is heated to prevent its solidification during feeding. Preferably, the molten PCM is fed into the melt mixing device after the components of the polymer matrix are already molten and thoroughly mixed, since molten PCM, when added to an individual component of the polymer matrix, may greatly reduce the viscosity of that component and impede proper homogenization of the entire composition. Mixing of molten polymer matrix components with the organogelator is performed at temperature allowing its full dissolution in the polymer melt. After thorough melt mixing of the components, according to proportions and sequence described above, the composition may be pelletized or shaped and solidified, using pelletizing or shaping equipment known in the art. If the low crystallinity or substantially amorphous component B of the polymer matrix is cross-linked, partially or fully, preferably it is dynamically cross-linked. Dynamic cross-linking is well known in the art. For example, U.S. Pat. Nos. 4,183,876 and 7,589,154 disclose appropriate techniques for such dynamic cross-linking. Such dynamic cross-linking may be performed in the course of the process of current invention or separately, prior or after manufacturing of the composition of the current invention. In the case the dynamic cross-linking is employed in the course of the present process, the PCM constituent is preferably fed into the molten polymer mixture after melting and thorough mixing of polymer components, but prior to feeding cross-linking agents.

Shaped Products of the Invention

The final shaped products of the invention include, but are not limited to filaments, pellets, sheets, molded articles, films, fibers, nonwoven fabrics, tubes, etc. Such products may be manufactured using any shaping technique known in the art and suitable for processing of polymer matrix constituents. Examples of such techniques include, but are not limited to extrusion, compression molding, injection molding, thermoforming, fiber spinning, 3D-printing. The parameters of these manufacturing procedures may differ from those regular for matrix polymers, and should be adjusted in some cases. Such final shaped products exhibit shape and dimensional stability, proper exploitation performance, and ability of thermal energy storage.

The following examples illustrate the subject matter of the invention without limiting its scope, showing some of the techniques used to prepare the compositions and to characterize their properties.

EXAMPLES

Techniques

The compositions were prepared using a Berstorff lab scale twin-screw extruder ZE25 (screws diameter 25 mm, L/D ratio 40), equipped with gravimetric feeders for solids and gravimetric dosing system for heated liquids. The screws configuration was adjusted to accommodate incorporation of large amounts of liquids into zone 5 of the barrel.

Melt flow rate (MFR) of the polymeric constituents was measured on pelletized compositions materials according to ISO 1133:2005 at 230° C. and 2.16 kg load for polypropylene and at 190° C. and 2.16 kg load for polyethylene, using Automatic Melt Flow Tester ex. CEAST.

PCM content in the final compositions was evaluated by high resolution TGA technique, using a Thermal Gravimetric Analyzer (TGA Q500, TA Instruments) at 20° C./min in nitrogen.

The thermal energy storage and release capability of the final compositions was estimated by DSC technique, using a Differential Scanning calorimeter (DSC 8000, Perkin Elmer). Phase transitions of PCM constituent of the compositions were characterized in terms of the temperature and the latent heat.

Rheological properties, including shear complex viscosity and gelation onset temperatures of the compositions were measured by oscillatory rheometry technique, using ARES G2 rheometer (TA Instruments). Plaques (3 mm thick) were produced from the polymer compositions. Discs punched out of these plaques were tested in dynamic temperature ramp oscillatory rotation experiments.

Fibers were produced from the same polymer composition in melt spinning experiments using a capillary rheometer with a Haul-Off module (RHEOGRAPH 25, Goettfert). The spinning was performed at temperatures 160-180° C. and spinning rates 1,000-4,500 mm/s.

Example 1: One-Step Compounding

Highly crystalline polypropylene homopolymer Capilene® G50 (MFR 3 g/10 min), low crystallinity (low density) polyethylene Ipethene® 4203 (MFR 0.2 g/10 min) and low crystallinity propylene-ethylene random copolymer Capilene® QC56E (MFR 0.7 g/10 min), all commercially available from Carmel Olefins, were dry mixed in equal proportion to obtain a blend comprising ~33% of high crystallinity polymer and ~67% of low crystallinity polymers. Sorbitol based organogelator commercially available from NJC under the trade name RiKAFAST® EDX, surface treated calcium carbonate powder commercially available from Microgil Industrial Minerals under the trade name Avgil 600, and antioxidant Irganox® 215, commercially available from BASF, were added to the dry blend to obtain a matrix mixture comprising:
25 wt % of high crystallinity polypropylene
25% of low crystallinity polypropylene
25% of low crystallinity polyethylene
4.6% of sorbitol based organogelator
20% of the calcium carbonate
0.4% of antioxidant The ratio of high crystallinity and low crystallinity polymer constituents in the matrix mixture was 1:2 (e.g. 33% of high crystallinity and 67% of low crystallinity polymers out of the total polymer content). The matrix mixture was charged in a main feeder of co-rotating twin-screw extruder, coupled with a water strand cooling bath and a strand pelletizer.

During a start-up step, the matrix mixture was continuously fed into the extruder at feeding rate of 2 kg/hour. The extruder screws rotation speed was 200 rpm, the temperature profile along the barrel was set as follows:

| heating zone | 13 | 8 | 7 | 6 | 5 | 4 | 3 | 2 | 1 |
|---|---|---|---|---|---|---|---|---|---|
| set temperature, ° C. | 180 | 180 | 180 | 180 | 180 | 270 | 270 | 220 | 45 |

After stabilization of the melt mixing conditions, feeding of molten n-octadecane (PCM) commercially available from Vertellus (A18) was started at feeding rate gradually increasing from 1 kg/hour to 2 kg/hour aiming at final composition with ~50 wt % PCM content. As the PCM addition started, the rotation speed was gradually increased up to 350 rpm, whereas the temperatures set along the barrel was gradually changed to get the following profile:

| heating zone | 13 | 8 | 7 | 6 | 5 | 4 | 3 | 2 | 1 |
|---|---|---|---|---|---|---|---|---|---|
| set temperature, ° C. | 145 | 150 | 150 | 150 | 160 | 250 | 270 | 220 | 45 |

The final melt blended polymer composition, comprising PCM incorporated within polyolefin matrix, was shaped into strands, extruded in the water cooling bath and pelletized. Properties of the resulting material are shown in Table 1. The composition demonstrated good spinnability. Fibers made of the composition were shape-stable up to the temperature of 160° C.

TABLE 1

| Properties | Example 1 | Example 2 | Example 3 |
|---|---|---|---|
| PCM melting peak, ° C. | 31.3 | 27.9 | 23.7 |
| PCM crystallization peak, ° C. | 22.9 | 21.2 | 15.2 |
| PCM phase transition latent heat, J/g | >70 | 130 | <30 |
| PCM content, wt % | 43 | 77.4 | 26.1 |
| Gelation onset temperature, ° C. | 200.8 | 169.3 | 207 |
| Complex viscosity at 160° C., Pa*s | 12870 | 1176 | 2386 |

Example 2: Two-Step Compounding

PCM containing composition was prepared via two-step compounding procedure using the same extruder with the same feeders and screw profile configuration as in Example 1, coupled with a laboratory underwater pelletizer (GALA, USA).

In the first step, composition similar to that of Example 1 was prepared with ~50 wt % PCM content. Unlike the Example 1, Capilene® G50 and Ipethene® 4203 were replaced by heterophasic copolymer Capilene® TG50 (MFR 3.5 g/10 min), commercially available from Carmel Olefins. Being heterophasic copolymer, the Capilene® TG50 provides a reactor blend of high crystallinity polypropylene homopolymer and low crystallinity ethylene-propylene rubber in the proportion 3:1. A dry blend of Capilene® TG50 and Capilene® QC56E, sorbitol based organogelator Geniset D (NJC), Avgil 600 calcium carbonate powder and Irganox® 215 was charged in the main feeder of the extruder. The blend contained:
39 wt % of Capilene® TG50
39 wt % of Capilene® QC56E
8 wt % of sorbitol based organogelator
12.6 wt % of the calcium carbonate
0.4 wt % of antioxidant The matrix composition contained 37 wt % of high crystallinity polymer and 63 wt % of low crystallinity polymer out of total polymer content.

During the start-up step, Ipethene® 4203 granules were continuously fed into the extruder at feeding rate of 2 kg/hour. The extruder screws rotation speed was 250 rpm, the temperature profile along the barrel was set as follows:

| heating zone | adapter | 8 | 7 | 6 | 5 | 4 | 3 | 2 | 1 |
|---|---|---|---|---|---|---|---|---|---|
| set temperature, ° C. | 150 | 150 | 150 | 160 | 160 | 220 | 230 | 220 | 45 |

After stabilization of the melt mixing conditions, feeding of molten paraffin wax (PCM) commercially available from Rubitherm (RT25) was started at feeding rate gradually increasing from 1 kg/hour to 2 kg/hour. As the PCM addition started, the rotation speed was gradually increased up to 350 rpm, whereas the temperatures set along the barrel was gradually changed to get the following profile:

| heating zone set temperature, ° C. | adapter 145 | 8 150 | 7 150 | 6 150 | 5 160 | 4 220 | 3 230 | 2 220 | 1 45 |
|---|---|---|---|---|---|---|---|---|---|

At this point started feeding of the dry blend from the main feeder. The dry blend feeding rate increased gradually to 1.5 kg/hour, whereas the polyethylene feeding rate decreased to 1.5 kg/hour, thus reaching total matrix components feeding rate 3 kg/hour. PCM feeding rate gradually increased further to 3 kg/hour aiming at final composition with ~50 wt % PCM content. The first-step melt blended polymer composition, comprising PCM incorporated within polyolefin matrix, was underwater pelletized and further used in the second step compounding.

In the second step, PCM containing pellets from the first step were dry mixed with wollastonite commercially available from Imerys Performance Additives under the trade name NYGLOS® 8, in 10:1 proportion and charged into the main feeder. Ipethene® 4203 granules were charged into another feeder and were used individually for purging and in start-up step. During the start-up step, Ipethene® 4203 granules were continuously fed into the extruder at feeding rate of 2 kg/hour. The extruder screws rotation speed was 250 rpm, the temperature profile along the barrel was set as follows:

| heating zone set temperature, ° C. | adapter 130 | 8 130 | 7 140 | 6 160 | 5 160 | 4 220 | 3 220 | 2 120 | 1 45 |
|---|---|---|---|---|---|---|---|---|---|

After stabilization of the melt mixing conditions, feeding of molten RT25 (PCM) was started at feeding rate gradually increasing from 1 kg/hour to 2 kg/hour. As the PCM addition started, the rotation speed was gradually increased up to 350 rpm, whereas the temperatures set along the barrel was gradually changed to get the following profile:

| heating zone set temperature, ° C. | adapter 125 | 8 125 | 7 125 | 6 130 | 5 140 | 4 145 | 3 145 | 2 120 | 1 30 |
|---|---|---|---|---|---|---|---|---|---|

At this point started feeding of the dry blend from the main feeder. The dry blend feeding rate increased gradually to 3 kg/hour, whereas the polyethylene feeding terminated. PCM feeding rate gradually increased further to 3 kg/hour aiming at final composition with ~75 wt % PCM content. The second-step final melt blended polymer composition was underwater pelletized and characterized. The testing results of the final composition are shown in Table 1.

Example 3: One Step Compounding

PCM containing composition was prepared in one-step compounding procedure using the same extruder with the same feeders, screw profile configuration and underwater pelletizer as in Example 2.

A dry blend comprising heterophasic polypropylene copolymer Capilene® TU75AV (commercially available from Carmel Olefins and containing a highly crystalline PP homopolymer and a low crystalline ethylene-propylene rubber in a proportion of 7:3), and random copolymer Capilene® QC56E, organogelator Geniset D, Avgil 600 calcium carbonate powder and Irganox® 215 was prepared and charged in the main feeder of the extruder. The blend contained:

59 wt % of Capilene® TU75AV
25% of Capilene® QC56E
6.7% of sorbitol based organogelator
8.4% of the calcium carbonate
0.3% of antioxidant Ipethene® 4203 granules were charged into separate feeder and were used individually for purging and in start-up step, and as a low crystallinity component of the final polymer composition.

During the start-up step, Ipethene® 4203 granules were continuously fed into the extruder at feeding rate of 2 kg/hour. The extruder screws rotation speed was 250 rpm, the temperature profile along the barrel was set as follows:

| heating zone set temperature, ° C. | adapter 150 | 8 150 | 7 150 | 6 160 | 5 160 | 4 220 | 3 230 | 2 220 | 1 45 |
|---|---|---|---|---|---|---|---|---|---|

After stabilization of the melt mixing conditions, feeding of molten RT25 (PCM) was started at feeding rate 1 kg/hour. As the PCM addition started, the rotation speed was gradually increased up to 350 rpm, whereas the temperatures set along the barrel was gradually changed to get the following profile:

| heating zone set temperature, ° C. | adapter 145 | 8 150 | 7 150 | 6 150 | 5 160 | 4 220 | 3 230 | 2 220 | 1 45 |
|---|---|---|---|---|---|---|---|---|---|

At this point started feeding of the dry blend from the main feeder. The dry blend feeding rate increased gradually to 2 kg/hour, whereas the polyethylene feeding rate decreased to 1 kg/hour, thus reaching total matrix components feeding rate 3 kg/hour. The high crystallinity component of the matrix blend constituted 32.5 wt % and the low crystallinity component 67.5 wt % of the total polymer content in the final composition. PCM feeding continued at rate 1 kg/hour aiming at final composition with ~25 wt % PCM content. The polymer composition, comprising PCM, was underwater pelletized. The testing results of the final composition are shown in Table 1.

While the invention has been described using some specific examples, many modifications and variations are possible. It is therefore understood that the invention is not intended to be limited in any way, other than by the scope of the appended claims.

The invention claimed is:

1. A thermoplastic shape-stable polymer composition configured to store and release thermal energy, the composition comprising at least one organic phase change material (PCM), and a polymer matrix comprising at least one highly crystalline polymer (polymer A) with at least one low crystallinity or substantially amorphous polymer (polymer B), and at least one organogelator for gelling molten compositions;
   wherein the polymer A is selected from the group consisting of crystalline polyolefins, polyesters, polyethers, polyamides, and blends thereof; and
   wherein the polymer B is selected from the group consisting of low density polyethylene, random copolymers of ethylene with $C_3$-$C_{10}$ alpha olefins, random copolymers of propylene with $C_4$-$C_{10}$ alpha-olefins, ethylene-propylene-diene copolymers, olefin block-copolymers, styrenic block-copolymers, polyolefin elastomers, and blends thereof.

2. The composition of claim 1, wherein the PCM comprises a crystalline organic material having a high latent heat of phase transition, chosen from normal paraffins, fatty acids, fatty acid esters, and blends thereof, and constituting from 10 to 80 wt % of the composition.

3. The composition of claim 1, wherein the polymer A is a thermoplastic polymer with a melting temperature above melting temperature of said PCM, and constitutes from 20 to 55 wt % of the polymer matrix.

4. The composition of claim 1, wherein the polymer A is polypropylene or high density polyethylene.

5. The composition of claim 1, wherein the polymer B is at least partially miscible with said PCM.

6. The composition of claim 1, comprising from 0.01 to 5 wt % of organogelators, being solidified gelled composition, while PCM undergoes multiple phase transitions.

7. The composition of claim 1, wherein the organogelator has a gelation onset temperature above a crystallization temperature of the polymer A.

8. The composition of claim 7, wherein the organogelator is chosen from sorbitol or nonitol derivatives.

9. The composition of claim 1, comprising additional organogelators, having gelation onset temperatures below a crystallization temperature of polymer A and above a crystallization temperature of the PCM.

10. The composition of claim 1, wherein the polymer B is dynamically cross-linked in the presence of the polymer A.

11. A process for manufacturing thermoplastic shape-stable polymer compositions configured to store and release thermal energy, comprising melt mixing in a device at least one highly crystalline polymer, polymer A of a polymer matrix, at least one low crystallinity or substantially amorphous polymer, polymer B of the polymer matrix, and at least one organogelator with an organic PCM, continuously or batch-wise, whereas the organic PCM is fed into said device in solid or liquid state;
  wherein the polymer A is selected from the group consisting of crystalline polyolefins, polyesters, polyethers, polyamides, and blends thereof, and
  wherein the polymer B is selected from the group consisting of low density polyethylene, random copolymers of ethylene with $C_3$-$C_{10}$ alpha olefins, random copolymers of propylene with $C_4$-$C_{10}$ alpha-olefins, ethylene-propylene-diene copolymers, olefin block-copolymers, styrenic block-copolymers, polyolefin elastomers, and blends thereof.

12. The process of claim 11, further comprising pelletizing or a shaping step selected from extrusion, injection molding, compression molding, and 3D-printing.

13. The process of claim 11, further comprising dynamic cross-linking of the polymer B in the presence of the polymer A.

14. A shape-stable product comprising the composition of claim 1, selected from filaments, pellets, profiles, sheets, molded articles, films, and fibers.

* * * * *